(12) United States Patent
Gurke et al.

(10) Patent No.: US 11,787,986 B2
(45) Date of Patent: Oct. 17, 2023

(54) ADHESIVE FILM BASED TRANSPARENT LAMINATE

(71) Applicant: Cariflex Pte. Ltd., Singapore (SG)

(72) Inventors: Thorsten Gurke, Ruppichteroth (DE); Maarten Cornelis Tromp, Purmerend (NL)

(73) Assignee: Cariflex Pte. Ltd., Singapore (SG)

( * ) Notice: Subject to any disclaimer, the term of this patent is extended or adjusted under 35 U.S.C. 154(b) by 0 days.

(21) Appl. No.: 17/690,999

(22) Filed: Mar. 9, 2022

(65) Prior Publication Data

US 2022/0315810 A1    Oct. 6, 2022

(30) Foreign Application Priority Data

Apr. 1, 2021    (EP) ..................................... 21166754

(51) Int. Cl.
  *C09J 151/04*    (2006.01)
(52) U.S. Cl.
  CPC .................................... *C09J 151/04* (2013.01)
(58) Field of Classification Search
  CPC .................................................. B32B 2319/00
  See application file for complete search history.

(56) References Cited

U.S. PATENT DOCUMENTS

| 9,708,518 B2 | 7/2017 | Zhang et al. |
| 9,932,463 B2 | 4/2018 | Van Der Waal et al. |
| 2016/0289430 A1 | 10/2016 | Van Der Waal et al. |

FOREIGN PATENT DOCUMENTS

| CA | 2660561 A1 | | 2/2008 |
| EP | 1420056 A1 | | 5/2004 |
| JP | 2004059890 | * | 2/2004 |
| JP | 2016-222861 A | | 12/2016 |
| WO | 2003/087224 A1 | | 10/2003 |
| WO | 2008/021318 A2 | | 2/2008 |
| WO | WO 2015140003 | * | 9/2015 |

OTHER PUBLICATIONS

Hirano et al., electronic translation of JP-2004059890, Feb. 2004.*
European Search Report for EP 21166754.8 dated Sep. 8, 2021.

* cited by examiner

*Primary Examiner* — Jeffrey C Mullis
(74) *Attorney, Agent, or Firm* — United One Law Group LLC; Kongsik Kim; Jhongwoo Peck

(57) ABSTRACT

A transparent laminate having a haze of less than 10% measured according to ASTM D1003-13, wherein the laminate comprises:
  i) at least a first substrate,
  ii) at least a second substrate and
  iii) an adhesive film between the first and second substrate, wherein the adhesive film is a cured, transparent rubber film obtained by curing an adhesive composition comprising:
    a) at least 80% by weight of at least one polyisoprene rubber,
    b) 0.5 to 15% by weight of at least one organic compound comprising at least two vinyl groups and
    c) 0.01 to 10% by weight of at least one peroxide compound.

16 Claims, No Drawings

ADHESIVE FILM BASED TRANSPARENT LAMINATE

CROSS-REFERENCE TO RELATED APPLICATION

This application claims priority from European Application No. 21166754.8 filed on Apr. 1, 2021, which application is incorporated herein by reference in its entirety.

TECHNICAL FIELD

The present invention relates to a transparent laminate having a haze of less than 10%, wherein the laminate comprises at least two substrates being firmly bonded with each other by means of an adhesive composition. Moreover, the present invention relates to a method for preparing such a transparent laminate and to the use of such a transparent laminate.

RELATED ART

Transparent laminates, i.e. laminates being made of transparent materials, are widely used in the industry. Prominent examples for such transparent laminates are automotive windscreens, burglar resistant windows, bullet proof windows, balustrades and the like. Such transparent laminates are made of several transparent substrates, such as of transparent substrates made of glass, plastics, such as acrylics, or the like, wherein adjacent substrates are firmly bonded with each other by an adhesive film being provided between the adjacent substrates. The substrates may have the form of a plate, a sheet, a film, a foil or the like. However, the use of adhesives is of course limited to transparent adhesives, because otherwise the adhesive would diminish the transparency of the laminate.

Currently, for this purpose transparent adhesives are used, which base on polyvinylbutyrate (PVB), aliphatic thermoplastic polyurethane (TPU), modified ethylene vinyl acetate (EVA) or similar thermoplastic polymers. These thermoplastic adhesive compositions are processed during the bonding process under heat and under pressure and/or vacuum and therefore melt during the bonding process, wherein bonds are formed between the molecules of the adhesive composition thus leading to an adhesion. Of course, the thermoplastic adhesives remain thermoplastic after the bonding process. On account of this reason, the adhesive may be re-molten after the bonding process and softens rapidly at a temperature being close, at or above its melting point. In general, the structural integrity of these adhesives is lost at a temperature, which is at least 20° C. below its melting point. For instance, an aliphatic thermoplastic polyurethane, which is typically used as a transparent adhesive for forming transparent laminates, and having a melting temperature or processing temperature, respectively, of 130° C. will lose its adhesive strength already at a temperature of 110° C. or even lower.

Furthermore, the aforementioned transparent adhesives typically used for the preparation of transparent laminates have usually a glass transition temperature between −20° C. and 30° C. On account of this reason, an adhesive film made of such a transparent adhesive loses its adhesive strength and—in addition to this—also loses its flexibility and gets brittle at cold temperatures, such as those being present in winter times.

Due to the above reasons, the transparent adhesives, which are presently typically used for the preparation of transparent laminates, have only a comparable narrow temperature area, in which they reliably work. Another drawback of these adhesives is that they have a comparable high water uptake, which is due to the presence of hydrophilic groups in the molecules of these adhesives.

SUMMARY

In view of this, the object underlying the present invention is to provide a transparent laminate, in particular a transparent laminate having a haze of less than 10% measured according to ASTM D1003-13, wherein the adhesive used in the laminate has an excellent transparency, a minimal water uptake and a very broad temperature range, in which the adhesive film maintains the desired adhesive strength, maintains the required flexibility and does not embrittle.

In accordance with the present invention, this object is satisfied by providing a transparent laminate having a haze of less than 10% measured according to ASTM D1003-13, wherein the laminate comprises:
  i) at least a first substrate,
  ii) at least a second substrate and
  iii) an adhesive film between the first and second substrate, wherein the adhesive film is a cured, transparent rubber film obtained by curing an adhesive composition comprising:
    a) at least 80% by weight of at least one polyisoprene rubber,
    b) 0.5 to 15% by weight of at least one organic compound comprising at least two vinyl groups and
    c) 0.01 to 10% by weight of at least one peroxide compound.

By using in the transparent laminate an adhesive film being made by curing an adhesive composition comprising at least 80% by weight of at least one polyisoprene rubber, 0.5 to 15% by weight of at least one organic compound comprising at least two vinyl groups and 0.01 to 10% by weight of at least one peroxide compound, not only an excellently transparent adhesive film is obtained, since polyisoprene rubber is completely transparent, but also an adhesive film having a high adhesive strength and tensile strength is obtained. While the adhesive strength is mainly improved by the addition of the polyisoprene rubber and the organic compound comprising at least two vinyl group, the tensile strength is improved by the addition of the polyisoprene rubber, the organic compound and the peroxide compound. In addition, the adhesive film of the transparent laminate of the present invention has a minimal water uptake, because polyisoprene rubber does not contain hydrophilic groups. On account of this minimal water uptake, not only the resistance of the transparent laminate against humidity is significantly improved, but also a loss of adhesive strength of the adhesive film and a haziness of the adhesive film, which both would be a consequence of the uptake of water over the time, are reliably avoided. A further particular advantage of the use of an adhesive film based on polyisoprene rubber in the transparent laminate in accordance with the present invention is its low glass transition temperature of about −50° C. allowing it to reliably function and maintain it properties even at cold temperatures. Moreover, polyisoprene rubber contains double bonds, which crosslink during the curing of the polyisoprene rubber in the presence of the at least one peroxide compound. This crosslinking drastically improves the heat resistance of the adhesive film. More specifically, crosslinked polyisoprene rubber does not melt and in particular does not melt at comparable low temperatures of about 130° C., such as adhesive films based on the aforementioned thermoplastic polymers. On account of the drastically improved heat resistance as well as on account of the significantly lower glass transition temperature of polyisoprene rubber, the adhesive film in accordance with the present invention has a very broad temperature range, in which the adhesive film maintains the desired adhesive strength, in which the adhesive film maintains the required flexibility and in which the adhesive film does not embrittle. In other words, the adhesive film and thus also the transparent laminate in accordance with the present invention has an excellently broad the temperature operating window.

DETAILED DESCRIPTION

In principle, the present invention is not limited concerning the kind of substrate(s) used in the transparent laminate, as long as the one or more substrates are transparent enough. For instance, each of the first substrate and the second substrate may have independently from each other the form of a plate, a sheet, a film or a foil or each of the first substrate and the second substrate may be any kind of molded part. Preferably, each of the first substrate and the second substrate are independently from each other made from a material selected from the group consisting of glass, polycarbonate, acrylate, polyethylene terephthalate, polybutylene terephthalate, polyamides and arbitrary combinations of two or more of the aforementioned materials.

As set out above, the transparent laminate in accordance with the present invention has a haze measured according to ASTM D1003-13 of less than 10%. Preferably, the haze of the transparent laminate measured according to ASTM D1003-13 is at most 5% and more preferably at most 2.5%. In order to obtain such a transparency of the transparent laminate, it is preferred that each of the substrates and also the adhesive film has a haze measured according to ASTM D1003-13 of less than 10%, more preferably of at most 5% and most preferably at most 2.5%. More specifically, the haze is measured in accordance with ASTM D1003-13 preferably by using 2 mm-thick sheet of a test material, wherein the value of haze is determined as the percentage of transmitted light which strays from the incident light in the angle of 0.044 rad or more by forward scattering.

Due to the same reasons, it is preferred that the transparent laminate in accordance with the present invention as well as each of the substrates and also the adhesive film has a total light transmission of at least 80%, more preferably of at least 85%, still more preferably of at least 90% and most preferably of at least 95%. The total light transmission is defined in accordance with the present invention as the ratio of light beam passed through a transparent material, i.e. the ratio of the total transmitted light to incident light, and is preferably measured according to ASTM D1003-13.

Moreover, it is preferred that the transparent laminate in accordance with the present invention as well as each of the substrates and also the adhesive film has a clarity of less than 20% and preferably of less than 15%. The clarity is measured in accordance with the present invention preferably at angles of less than 2.5°.

In accordance with the present invention, the adhesive film between adjacent substrates the transparent laminate is a cured, transparent rubber film obtained by curing an adhesive composition comprising at least 80% by weight of at least one polyisoprene rubber. This means that the adhesive composition comprises one or more polyisoprene rubbers. However, it is preferred that the adhesive composition does not contain any further rubber being not a polyisoprene rubber, or, in other words, it is preferred that the adhesive composition comprises as sole rubber component one or more polyisoprene rubbers.

The polyisoprene rubber may be a copolymer of isoprene including up to 50 mol-% of one or more comonomers. Moreover, the polyisoprene may be functionalized with one or more functional groups or non-functionalized. However, it is particular preferred that in the present invention a homopolymer of isoprene and in particular a non-functionalized homopolymer of isoprene is used as polyisoprene rubber and most preferred that the adhesive composition comprises as sole rubber component one or more non-functionalized polyisoprene homopolymer rubbers.

In principle, the polyisoprene rubber may be a 1,4-polyisoprene homopolymer, a 1,2-polyisoprene homopolymer or a 3,4-polyisoprene homopolymer. However, good results are in particular obtained, when the adhesive composition contains, preferably as sole rubber component, one or more 1,4-polyisoprene homopolymers. Therefore, it is preferred that the at least one polyisoprene rubber contains at least 50% by weight, preferably at least 75% by weight, more preferably at least 90% by weight, still more preferably at least 95% by weight, yet more preferably at least 99% by weight and most preferably consists of non-functionalized 1,4-polyisoprene homopolymer.

In a further development of the idea of the present invention, it is suggested that the adhesive composition contains, preferably as sole rubber component, one or more high-cis 1,4-polyisoprene homopolymers. Consequently, it is preferred that the at least one polyisoprene rubber contains at least 50% by weight, preferably at least 80% by weight, more preferably at least 90% by weight, still more preferably at least 95% by weight, yet more preferably at least 99% by weight and most preferably consists of non-functionalized cis-1,4-polyisoprene. High-cis-1,4-polyisoprene rubber may be either synthetic polyisoprene (homopolymer) rubber, which is generally called "isoprene rubber" (IR), or natural rubber. However, natural rubber is according to the present invention not preferred, because it is not transparent enough, but, depending on the source plant, too much coloured. Therefore, it is particularly preferred that the adhesive composition contains, preferably as sole rubber component, one or more synthetic high-cis 1,4-polyisoprene homopolymers, i.e. one or more high-cis isoprene rubbers. Again, high high-cis isoprene rubber means that it contains at least 50% by weight, preferably at least 80% by weight, more preferably at least 90% by weight, still more preferably at least 95% by weight, yet more preferably at least 99% by weight and most preferably consists of non-functionalized cis-1,4-polyisoprene. The isoprene rubber may be produced by anionic polymerization using for instance as catalyst butyl lithium, by coordination polymerization using for instance as catalyst a Ziegler-Natta catalyst or a neodymium catalyst.

In view of the mechanical properties, such as flexibility, tensile strength and elongation properties, it is preferred that the at least one polyisoprene rubber and preferably the synthetic high-cis 1,4-polyisoprene homopolymer has a weight average molecular weight of at least 250,000 g/mol and more preferably of at least 500,000 g/mol. In accordance with the present invention the molecular weight is determined pursuant to ASTM 3536 using mono-dispersed polystyrene standards.

In accordance with another preferred embodiment of the present invention, the at least one polyisoprene rubber has a logarithmic inherent viscosity value of 6.0 to 7.5 dl/g, preferably of 6.4 to 7.2 dl/g and more preferably of 6.6 to 7.0 dl/g.

In accordance with the present invention, the adhesive composition comprises at least 80% by weight of the at least one polyisoprene rubber. Preferably, the content of the at least one polyisoprene rubber (i.e. the total content of polyisoprene rubber) in the adhesive composition is at least 85% by weight, more preferably at least 90% by weight and most preferably 90 to 95% by weight based on 100% by weight of the adhesive composition.

In principle, the present invention is not particularly limited concerning the at least one organic compound comprising at least two vinyl groups. Good results are in particular obtained in terms of improving the adhesive strength and also of the tensile strength of the adhesive film, when the at least one organic compound comprising at least two vinyl groups is a di- or higher functional (meth)acrylate compound and preferably a tri- or higher functional (meth)acrylate compound.

Particular suitable examples for organic compounds comprising at least two vinyl groups are those being selected from the group consisting of ethylene glycol methacrylate (EGDMA), trimethylolpropane trimethacrylate (TMPTMA), triallyl isocyanurate, triallyl cyanurate, diethylene glycol diacrylate, neophenylene glycol diacrylate and arbitrary combinations of two or more of the aforementioned compounds. Most preferably, the adhesive composition of the transparent laminate in accordance with the present invention comprises as organic compound comprising at least two vinyl groups TMPTMA.

In a further development of the idea of the present invention, it is proposed that the content of the at least one organic compound comprising at least two vinyl groups in the adhesive composition is 1 to 10% by weight, more preferably 2 to 10% by weight, even more preferably 4 to 10% by weight and most preferably 6 to 10% by weight based on 100% by weight of the adhesive composition.

Concerning the kind of peroxide compound, the present invention is not particularly limited. However, good results are in particular obtained in terms of improving the tensile strength of the adhesive film, when the at least one peroxide compound included in the adhesive composition is selected from the group consisting of 2,5-dimethyl-2,5-di-(t-butylperoxy)hexane, dicumyl peroxide, benzoyl peroxide, 1,1-bis-(t-butylperoxy)-3,5,5-trimethylcyclohexane, diisobutyryl peroxide, cumylperoxy neodecanoate, di-n-propylperoxy dicarbonate, di-isopropyl peroxy dicarbonate, di-sec-butylperoxy dicarbonate, 1,1,3,3-tetramethyl-butylperoxy neodecanoate, di-(4-t-butylcyclohexyl)peroxy dicarbonate, di(2-ethylhexyl)peroxy dicarbonate, t-hexylperoxy neodecanoate, t-butylperoxy neodecanoate, t-butylperoxy neoheptanoate, t-hexylperoxy pivalate, t-butylperoxy pivalate, di(3,5,5-trimethyl-hexanoyl) peroxide, dilauroyl peroxide, 1,1,3,3-tetramethyl-butylperoxy-2-ethylhexanoate, disuccinic acid peroxide, 2,5-dimethyl-2,5-di(2-ethylhexanoylperoxy)hexane, t-hexylperoxy-2-ethylhexanoate, di(4-methyl-benzoyl) peroxide, t-butylperoxy-2-ethylhexanoate, di(3-methyl-benzoyl) peroxide, benzoyl(3-methyl-benzoyl) peroxide, dibenzoyl peroxide, 1,1-di(t-butylperoxy)-2-methyl-cyclohexane, 1,1-di(t-hexylperoxy)-3,3,5-trimethylcyclohexane, 1,1-di(t-hexylperoxy)cyclohexane, 1,1-di(t-butylperoxy) cyclohexane, 2,2-di(4,4-di(t-butylperoxy)cyclohexyl) propane, t-hexylperoxyisopropyl monocarbonate, t-butylperoxy maleic acid, t-butylperoxy-3,5,5-trimethyl hexanoate, t-butylperoxy laurate, t-butylperoxyisopropyl monocarbonate, t-butylperoxy-2-ethylhexyl monocarbonate, t-hexylperoxy benzoate, 2,5-dimethyl-2,5-di(benzoylperoxy)hexane, t-butylperoxy acetate, 2,2-di-(t-butylperoxy) butane, t-butylperoxy benzoate, n-butyl-4,4-di-(t-butylperoxy) valerate, di(2-t-butylperoxyisopropyl)benzene, di-t-hexyl peroxide, t-butylcumyl peroxide, di-t-butyl peroxide, p-menthane hydroperoxide, 2,5-dimethyl-2,5-di(t-butylperoxy)hexyne-3, diisopropylbenzene hydroperoxide, 1,1,3,3-tetramethyl-butyl hydroperoxide, cumene hydroperoxide, and t-butyl hydroperoxide. Particular preferred is that the peroxide compound included in the adhesive composition is selected from the group consisting of 2,5-dimethyl-2,5-di-(t-butylperoxy)hexane, 1,1-di(t-butylperoxy)cyclohexane, 2,5-dimethyl-2,5-di-(t-butylperoxy)hexane and arbitrary combinations of two or more of the aforementioned compounds.

Preferably, the content of the at least one peroxide compound in the adhesive composition is 0.1 to 5.0% by weight, preferably 0.3 to 3.0% by weight, more preferably 0.4 to 2.0% by weight and most preferably 0.5 to 1.0% by weight based on 100% by weight of the adhesive composition.

In accordance with a further particular preferred embodiment of the present invention, the adhesive composition further comprises at least one adhesion promoter. The addition of an adhesion promoter improves the adhesive strength as well as the tensile strength of the adhesive film.

Good results are in particular obtained, when the at least one adhesion promoter is an aminofunctional silane or an alkyl-substituted aminofunctional silane.

In accordance with one variant of this embodiment of the present invention, the at least one adhesion promoter is a silane according to the general formula (I):

$$R^1\text{—Si}(OR^2)_3 \qquad (I),$$

in which $R^1$ is a primary or secondary aminoalkyl group and preferably an aminophenyl group, an alicyclic amino group or a $NH_2(CH_2)_n$-group with n being an integer between 1 and 10, preferably between 1 and 4 and more preferably of 1, 2 or 3, and $R^2$ is a $C_{1-10}$-alkyl group, preferably, a $C_{1-4}$-alkyl group and more preferably a methyl, ethyl or propyl group.

Preferred examples of this variant are 3-aminopropyltriethoxysilane, 3-amino-propyltrimethoxysilane, 3-aminopropyltripropoxysilane, 3-(N-phenylamino)propyl-triethoxysilane, 3-(N-phenylamino)propyltrimethoxysilane, 3-(N-phenyl-amino)propyltripropoxysilane, 3-(N-cyclohexylamino)propyl-triethoxysilane, 3-(N-cyclohexylamino)propyltrimethoxysilane, 3-(N-cyclohexylaminoamino)propyl-tripropoxysilane, 2-aminoethylriethoxysilane, 2-aminoethyltrimethoxysilane, 2-aminoethyltripropoxysilane, aminomethyltriethoxysilane, aminomethyltrimethoxy-silane, aminomethyltripropoxysilane, diethylaminopropyltriethoxysilane, diethylaminopropyltrimethoxysilane, diethylaminopropyltripropoxysilane, dimethylaminopropyltriethoxysilane, dimethylaminopropyltrimethoxysilane and dimethylaminopropyltripropoxysilan. Most preferred of these is 3-aminopropyl-triethoxysilane.

In accordance with an alternative variant of this embodiment of the present invention, the at least one adhesion promoter is a silane according to the general formula (II):

$$NH\text{—}(R^3\text{—Si}(OR^2)_3)_2 \qquad (II),$$

in which $R^2$ and $R^3$ are, independently from each other, a $C_{1-10}$-alkyl group, preferably a $C_{1-4}$-alkyl group and more preferably a methyl, ethyl or propyl group.

A particular preferred example of this variant is bis[(3-triethoxysilyl)propyl]amine, i.e. $NH\text{—}((CH_2)_3\text{—Si}(OC_2H_5)_3)_2$.

Preferably, the content of the at least one adhesion promoter in the adhesive composition is 0.1 to 10% by weight, preferably 0.5 to 6% by weight and more preferably 1 to 5% by weight based on 100% by weight of the adhesive composition.

The adhesive film of the transparent laminate in accordance with the present invention may further include one or more additional components, such as one or more antioxidants, one or more reducing agents, one or more oxygen scavengers, one or more light stabilizers, one or more fillers or the like. The content of the additional components in the adhesive composition may be up to 2% by weight based on 100% by weight of the adhesive composition.

In accordance with a particular preferred embodiment of the present invention, the adhesive film of the transparent laminate is a cured, transparent rubber film obtained by curing an adhesive composition, which consists, based on 100% by weight of the adhesive composition, of:
- a) at least 80% by weight, preferably at least 85% by weight, more preferably at least 90% by weight and most preferably 90 to 95% by weight of isoprene rubber,
- b) 0.5 to 15% by weight, preferably 1 to 10% by weight, more preferably 2 to 10% by weight, even more preferably 4 to 10% by weight and still more preferably 6 to 10% by weight of at least one organic compound comprising at least two vinyl groups,
- c) 0.01 to 10% by weight, preferably 0.1 to 5% by weight, more preferably 0.3 to 3% by weight, even more preferably 0.4 to 2% by weight and still more preferably 0.5 to 1% by weight of at least one peroxide compound,
- d) 0 to 10% by weight, preferably 0.1 to 10% by weight, more preferably 0.5 to 6% by weight and most preferably 1 to 5% by weight of at least one adhesion promoter,
- e) 0.01 to 5% by weight, preferably 0.1 to 3% by weight and more preferably 0.5 to 2% by weight of one or more antioxidants, and
- f) less than 2% by weight, preferably less than 1% by weight and more preferably less than 0.5% by weight of one or more other compounds.

As set out above, it is in particular preferred that adhesive composition does not comprise any further rubber being not a non-functionalized 1,4-polyisoprene and more preferably does not comprise any further rubber being not a non-functionalized high-cis 1,4-polyisoprene homopolymer.

The present invention is not particularly limited concerning the thickness of the adhesive film of the transparent laminate. Good results are in particular obtained, when the thickness of the adhesive film of the transparent laminate is 0.1 to 5 mm, more preferably 0.5 to 4 mm, still more preferably 1.0 to 3.0 mm and most preferably 2.5 to 3.5 mm.

In a further development of the idea of the present invention, it is suggested that the transparent laminate in accordance with the present invention has a yellowness measured in accordance with ASTM E313 of less than zero and more preferably of less than −2.

Preferably, the cured, transparent rubber film of the transparent laminate in accordance with the present invention has an elongation measured in accordance with ISO 73-2005 of at least 250%, more preferably of at least 500% and most preferably of at least 1,000%.

Furthermore, it is preferred that the cured, transparent rubber film of the transparent laminate in accordance with the present invention has a type A durometer hardness of 35 to 70, more further preferably of 40 to 70 and most preferably of 50 to 70.

Also, it is preferred that the cured, transparent rubber film of the transparent laminate in accordance with the present invention has a tear strength of at least 10 N/mm, more preferably of 10 to 50 N/mm and most preferably of 10 to 40 N/mm measured with a 2 mm-thick laminate according to JIS K6252.

The transparent laminate in accordance with the present invention is not limited to one having two substrates. Rather, the transparent laminate in accordance with the present invention may be a multi-layer laminate comprising in addition to the first and second substrates one or more further substrates, wherein between each of two adjacent substrates an adhesive film as described above. For instance, the transparent laminate in accordance with the present invention may comprise 2 to 100 substrates, wherein between each of two adjacent substrates an adhesive film as described above is provided.

A further aspect of the present invention is a method of producing an aforementioned transparent laminate, which comprises the following steps:
- i) providing at least a first substrate,
- ii) providing at least a second substrate,
- iii) providing an adhesive composition between the at least a first and at least a second substrate so as to obtain a laminate, wherein the adhesive composition comprises:
  - a) at least 80% by weight of at least one polyisoprene rubber,
  - b) 0.5 to 15% by weight of at least one organic compound comprising at least two vinyl groups and
  - c) 0.01 to 10% by weight of at least one peroxide compound, and
- iv) curing the adhesive composition of laminate provided between the first and second substrate at a temperature of 60 to 200° C. so as to cure the adhesive composition to a cured, transparent rubber film.

Preferably, the laminate is cured under pressure during step iv).

In accordance with a further aspect, the present invention relates to the use of an aforementioned transparent laminate, where transparency is required, such as as automotive windscreen, as burglar resistant window, as bullet proof window, as headlight of an automobile, as shatter proof article, as TV screen or as balustrade.

Subsequently, the present invention is illustrated by means of non-limiting examples.

Examples 1 to 12 and Comparative Example 1

For the examples, the components were used in the amounts as summarized in the below table 1. For comparative example 1, a film made of commercially available TPU (thermoplastic polyurethane) was used. The mentioned components were as follows:

IR0307 is a high-cis 1,4-polyisoprene having a logarithmic inherent viscosity value of 6.80 dl/g distributed by Cariflex Pte. Ltd.

SKI 5PM is a Nd based ZN—IR distributed by Sintez Kauchuk.

Irganox 1726 is an antioxidant distributed by BASF AG.

TMPTMA is trimethylolpropane trimethacrylate distributed by Sigma-Aldrich.

Dynasilan 1122 is an alkyl-substituted aminofunctional silane distributed by Evonik Resource Efficiency GmbH.

Trigonox 101 is 2,5-dimethyl-2,5-di-(t-butylperoxy) hexane distributed by Nouryon.

TPU is a film made of thermoplastic polyurethane distributed under the tradename Krystalflex by Huntsman LLC.

All components of the examples were uniformly compounded on a two roll (rubber) mill at a temperature of 55° C. and the resulting mixtures were uniformly kneaded. The kneaded mixtures were cut off from the roller to each a sheet having 1 mm to 3 mm thickness. The obtained sheets were maturated at room temperature for one day and night. For the glass-glass laminates, the matured sheets were cured between two small glass-plates of 4 mm thick float glass in a heating press machine (manufactured by Fontijne Grotnes BV) at a temperature of 130° C. and a pressure up to 100 N for 90 minutes. During the (laminate) cure process both ambient pressure and vacuum were applied. Samples for the adhesive strength measurements have been prepared according to the same procedure except that only 1 mm thick glass objects have been used for these samples. For the mechanical properties and water uptake measurements, cured rubber sheets (2 mm) have been prepared at a temperature of 130° C. for 90 minutes. In this case no vacuum and higher pressure (up to 400 N) were used. Afterwards, the properties were measured of these samples as well as those of the film of comparative example 1. The results are summarized in table 1.

The results summarized in table 1 show that both, the addition of the organic compound comprising two vinyl groups (TMPTMA) and the peroxide compound increases the tensile strength of the compositions of the examples. For both ingredients an optimum was found in relation with the adhesive strength. Furthermore, TMPTMA and the adhesion promoter (Dynasilan) were found to increase the adhesive strength of the compositions of the examples. While the tensile strength was significantly increased by the content of the peroxide compound, the effect of the peroxide compound on the adhesive strength of the adhesive film was lower. The data further show that the glass-glass laminates with the adhesive films between the glass plates of the compositions of the examples had excellent transparent properties. In addition, the data show that the adhesive films of the examples had an excellently low water uptake and an excellently low glass transition temperature so that they maintain their properties even under cold conditions. In contrast thereto, the film of the comparative example had a drastically higher glass transition temperature and as well as a higher water uptake.

TABLE 1

Composition and results of the examples and comparative example 1

| | Example | | | | | | |
|---|---|---|---|---|---|---|---|
| | 1 phr | 2 phr | 3 phr | 4 phr | 5 phr | 6 phr | 7 phr |
| IR0307 | 100 | 100 | 100 | 100 | 100 | 100 | 100 |
| SKI 5PM | 0 | 0 | 0 | 0 | 0 | 0 | 0 |
| Irganox 1726 | 1 | 1 | 1 | 1 | 1 | 1 | 1 |
| TMPTMA | 5 | 7.5 | 10 | 2.5 | 2.5 | 15 | 2.5 |
| Dynasilan 1122 | 0 | 0 | 0 | 0 | 0 | 0 | 0 |
| Trigonox 101 | 0.2 | 0.2 | 0.2 | 0.4 | 0.8 | 1.2 | 1.5 |
| Cure Conditions | | | | | | | |
| Compound storage time [weeks] | 0-2 | 0-2 | 0-2 | 0-2 | 0-2 | 0-2 | 0-2 |
| Cure Temperature [° C.] | 130 | 130 | 130 | 130 | 130 | 130 | 130 |
| Cure time [min] | 90 | 90 | 90 | 90 | 90 | 90 | 90 |
| Mechanical Properties | | | | | | | |
| Compound storage time [weeks] | <1 | <1 | <1 | <1 | <1 | <1 | <1 |
| Film thickness [mm] | 2 | 2 | 2 | 2 | 2 | 2 | 2 |
| Tensile strength [Mpa] | 2.3 | 2.9 | 3.4 | 2.5 | 6.5 | 11.7 | 8.0 |
| S.D. (Standard Deviation) | 0.4 | 0.6 | 1.3 | 0.3 | 1.6 | 1.5 | 2.6 |
| Elongation at break [%] | 1218 | 1059 | 1016 | 1214 | 1024 | 727 | 929 |
| S.D. | 69 | 24 | 77 | 19 | 54 | 49 | 70 |
| Hardness | | | | | | | |
| Shore A [6 mm/30 sec] | 14 | 12 | 17 | 16 | 23 | 33 | 26 |
| Adhesive Strength/Bond strength | | | | | | | |
| Compound storage time [weeks] | <1 | <1 | <1 | <1 | <1 | <1 | <1 |
| Film thickness [mm] | 1 | 1 | 1 | 1 | 1 | 1 | 1 |
| Mean shear [N] | 477 | 416 | 321 | 256 | 306 | 500 | 265 |
| Median shear (N) | 500 | 500 | 260 | 259 | 320 | 500 | 257 |
| S.D. | 79 | 125 | 136 | 36 | 43 | 0 | 36 |
| Visual Properties G-G laminates | | | | | | | |
| no compound storage - day 1 | | | | | | | |
| Transpancy [%] | n.d. | n.d. | n.d. | n.d. | n.d. | n.d. | n.d. |
| Haze [%} | n.d. | n.d. | n.d. | n.d. | n.d. | n.d. | n.d. |
| Clarity [%] | n.d. | n.d. | n.d. | n.d. | n.d. | n.d. | n.d. |
| Yellowness index | n.d. | n.d. | n.d. | n.d. | n.d. | n.d. | n.d. |
| no compound storage - 3 months | | | | | | | |
| Transpancy [%] | n.d. | n.d. | n.d. | n.d. | n.d. | n.d. | n.d. |
| Haze [%} | n.d. | n.d. | n.d. | n.d. | n.d. | n.d. | n.d. |

TABLE 1-continued

Composition and results of the examples and comparative example 1

| | | | | | | | |
|---|---|---|---|---|---|---|---|
| Clarity [%] | n.d. | n.d. | n.d. | n.d. | n.d. | n.d. | n.d. |
| Yellowness index | n.d. | n.d. | n.d. | n.d. | n.d. | n.d. | n.d. |
| Water uptake [after 1000 h dwell time] | | | | | | | |
| Average water uptake [% w/w] | n.d. | n.d. | 0.36 | n.d. | n.d. | 0.23 | n.d. |
| Glass Transition Temperature | | | | | | | |
| Tg (tan delta) [° C.] | n.d. | n.d. | −48 | n.d. | n.d. | n.d. | n.d. |

| | Example | | | | | |
|---|---|---|---|---|---|---|
| | 8 phr | 9 phr | 10 phr | 11 phr | 12 phr | CE1 phr |
| IR0307 | 100 | 100 | 100 | 100 | 0 | |
| SKI 5PM | 0 | 0 | 0 | 0 | 100 | |
| Irganox 1726 | 1 | 1 | 1 | 1 | 1 | |
| TMPTMA | 2.5 | 2.5 | 2.5 | 2.5 | 2.5 | |
| Dynasilan 1122 | 0 | 0 | 2 | 4 | 0 | |
| Trigonox 101 | 3 | 0.2 | 0.2 | 0.2 | 0.2 | |
| Cure Conditions | | | | | | |
| Compound storage time [weeks] | 0-2 | 0-5 | 0-5 | 0-5 | 0-5 | |
| Cure Temperature [° C.] | 130 | 130 | 130 | 130 | 130 | |
| Cure time [min] | 90 | 90 | 90 | 90 | 90 | |
| Mechanical Properties | | | | | | |
| Compound storage time [weeks] | <1 | <1 | <1 | <1 | <1 | |
| Film thickness [mm] | 2 | 2 | 2 | 2 | 2 | 0.1 |
| Tensile strength [Mpa] | 6.7 | 0.6 | 1.1 | 1.4 | 0.2 | 53 |
| S.D. (Standard Deviation) | 2.7 | 0.2 | 0.3 | 0.1 | 0.02 | 12 |
| Elongation at break [%] | 709 | 1336 | 1268 | 1242 | 516 | 305 |
| S.D. | 48 | 186 | 122 | 50 | 272 | 53 |
| Hardness | | | | | | |
| Shore A [6 mm/30 sec] | 30 | 8 | 12 | 12 | 3 | n.d. |
| Adhesive Strength/Bond strength | | | | | | |
| Compound storage time [weeks] | <1 | <1 | <1 | <1 | <1 | n.d. |
| Film thickness [mm] | 1 | 1 | 1 | 1 | 1 | n.d. |
| Mean shear [N] | 261 | 220 | 500 | 491 | 130 | n.d. |
| Median shear (N) | 253 | 216 | 500 | 500 | 133 | n.d. |
| S.D. | 38 | 48 | 0 | 28 | 13 | n.d. |
| Visual Properties G-G laminates | | | | | | |
| no compound storage - day 1 | | | | | | |
| Transpancy [%] | n.d. | 89.9 | 89.8 | 90.2 | 86.1 | 87.4 |
| Haze [%} | n.d. | 1.8 | 2.2 | 1.2 | 2.5 | 3.9 |
| Clarity [%] | n.d. | 99.0 | 98.5 | 99.4 | 99.2 | 98.9 |
| Yellowness index | n.d. | −6.9 | −5.1 | −5.0 | −5.2 | −7.3 |
| no compound storage - 3 months | | | | | | |
| Transpancy [%] | n.d. | 90.1 | 90.4 | 90.5 | 86.6 | 88.0 |
| Haze [%} | n.d. | 1.7 | 1.0 | 1.3 | 3.0 | 2.1 |
| Clarity [%] | n.d. | 99.2 | 99.3 | 99.3 | 99.2 | 99.1 |
| Yellowness index | n.d. | −7.4 | −6.2 | −5.6 | −6.0 | −7.9 |
| Water uptake [after 1000 h dwell time] | | | | | | |
| Average water uptake [% w/w] | n.d. | 0.41 | n.d. | 0.37 | n.d. | 0.7-0.9 |
| Glass Transition Temperature | | | | | | |
| Tg (tan delta) [° C.] | n.d. | −48 | n.d. | n.d. | n.d. | 26 |

The invention claimed is:

1. A transparent laminate having a haze of less than 10% measured according to ASTM D1003-13, the transparent laminate comprising:
   i) at least a first substrate,
   ii) at least a second substrate and
   iii) an adhesive film between the first and second substrate, wherein the adhesive film is a cured, transparent rubber film obtained by curing an adhesive composition comprising:
      a) at least 80% by weight of at least one polyisoprene rubber,
      b) 0.5 to 15% by weight of at least one organic compound comprising at least two vinyl groups and
      c) 0.01 to 10% by weight of at least one peroxide compound.

2. The transparent laminate in accordance with claim 1, wherein each of the first substrate and the second substrate have independently from each other the form of a plate, a sheet, a film or a foil, and wherein each of the first substrate and the second substrate are independently from each other made from a material selected from the group consisting of glass, polycarbonate, acrylate, polyethylene terephthalate, polybutylene terephthalate, polyamides and arbitrary combinations of two or more of the aforementioned materials.

3. The transparent laminate in accordance with claim 1, wherein the at least one polyisoprene rubber contains at least 50% by weight of non-functionalized 1,4-polyisoprene homopolymer.

4. The transparent laminate in accordance with claim 1, wherein the at least one polyisoprene rubber has i) a weight average molecular weight of at least 250,000 g/mol and/or ii) a logarithmic inherent viscosity value of 6.0 to 7.5 dl/g.

5. The transparent laminate in accordance with claim 1, wherein the at least one organic compound comprising at least two vinyl groups included in the adhesive composition is a di- or higher functional (meth)acrylate compound.

6. The transparent laminate in accordance with claim 5, wherein the at least one organic compound comprising at least two vinyl groups included in the adhesive composition is selected from the group consisting of ethylene glycol methacrylate (EGDMA), trimethylolpropane trimethacrylate (TMPTMA), triallyl isocyanurate, triallyl cyanurate, diethylene glycol diacrylate, neophenylene glycol diacrylate and arbitrary combinations of two or more of the aforementioned compounds.

7. The transparent laminate in accordance with claim 1, wherein the content of the at least one organic compound comprising at least two vinyl groups in the adhesive composition is 1 to 10% by weight based on 100% by weight of the adhesive composition.

8. The transparent laminate in accordance with claim 1, wherein the at least one peroxide compound included in the adhesive composition is selected from the group consisting of 2,5-dimethyl-2,5-di-(t-butylperoxy)hexane, 1,1-di(t-butylperoxy)cyclohexane, 2,5-dimethyl-2,5-di-(t-butylperoxy)hexane and arbitrary combinations of two or more of the aforementioned compounds.

9. The transparent laminate in accordance with claim 1, wherein the content of the at least one peroxide compound in the adhesive composition is 0.1 to 5% by weight based on 100% by weight of the adhesive composition.

10. The transparent laminate in accordance with claim 1, wherein the adhesive composition further comprises at least one adhesion promoter, wherein the at least one adhesion promoter is an aminofunctional silane or an alkyl-substituted aminofunctional silane.

11. The transparent laminate in accordance with claim 10, wherein the at least one adhesion promoter is a silane according to the general formula (I):

in which $R^1$ is a primary or secondary aminoalkyl group, and
$R^2$ is a $C_{1-10}$-alkyl group,
or a silane according to the general formula (II):

in which $R^2$ and $R^3$ are, independently from each other, a $C_{1-10}$-alkyl group.

12. The transparent laminate in accordance with claim 1, wherein the transparent laminate has a yellowness measured in accordance with ASTM E313 of less than zero, and/or wherein the cured, transparent rubber film has an elongation measured in accordance with ISO 73-2005 of at least 250%.

13. The transparent laminate in accordance with claim 1, wherein the transparent laminate is a multi-layer laminate comprising in addition to the first and second substrates one or more further substrates, wherein between each of two adjacent substrates an adhesive film as specified in claim 1 is provided.

14. A method of producing the transparent laminate in accordance with claim 1, the method comprising:
   i) providing at least a first substrate,
   ii) providing at least a second substrate,
   iii) providing an adhesive composition between the at least first and at least second substrate so as to obtain a laminate, wherein the adhesive composition comprises:
      a) at least 80% by weight of at least one polyisoprene rubber,
      b) 0.5 to 15% by weight of at least one organic compound comprising at least two vinyl groups and
      c) 0.01 to 10% by weight of at least one peroxide compound, and
   iv) curing the adhesive composition of laminate provided between the first and second substrate at a temperature of 60 to 200° C. so as to cure the adhesive composition to a cured, transparent rubber film.

15. The method in accordance with claim 14, wherein during step iv) the laminate is cured under pressure.

16. The transparent laminate in accordance with claim 11, wherein said $R^1$ is an $NH_2(CH_2)_n$-group with n being an integer between 1 and 10, inclusive.

* * * * *